United States Patent [19]

Takahashi

[11] Patent Number: 4,790,781

[45] Date of Patent: Dec. 13, 1988

[54] LUBRICATING CONSTRUCTION FOR MARINE PROPULSION DEVICE OF WATER JET TYPE

[75] Inventor: Hideharu Takahashi, Hamamatsu, Japan

[73] Assignee: Sahshin Kobyo Kabushiki Kaisha, Shizuoka, Japan

[21] Appl. No.: 44,811

[22] Filed: Apr. 30, 1987

[30] Foreign Application Priority Data

May 1, 1986 [JP] Japan .................................. 61-101426

[51] Int. Cl.⁴ ............................................ B63H 11/02
[52] U.S. Cl. ......................................... 440/38; 440/76; 440/78
[58] Field of Search ............................. 440/38, 40–43, 440/75, 76, 78, 83, , 900, 53, 55

[56] References Cited

U.S. PATENT DOCUMENTS

| 1,763,970 | 6/1930 | Johnson | 440/75 |
| 3,282,240 | 11/1966 | Pipes | 440/55 |
| 3,338,169 | 8/1967 | Kinney | 440/40 |
| 3,465,523 | 9/1969 | Clark, Jr. | 440/40 X |

OTHER PUBLICATIONS

Owner's Manual for AQUAFIN Outboard Jets (Jet-Craft, Inc., Tacoma, Washington, U.S.A.)

Primary Examiner—Sherman D. Basinger
Attorney, Agent, or Firm—Ernest A. Beutler

[57] ABSTRACT

Two embodiments of marine outboard drives incorporating a lubricant cavity that encircles at least one of the drive shaft supporting bearings and which is adapted to contain a lubricating oil for lubricating the bearing. There is provided a drain passage that intersects the lubricant cavity and which is disposed so that it will be positioned below the lower portion of the cavity when the outboard drive is tilted up to a service condition.

11 Claims, 3 Drawing Sheets

LUBRICATING CONSTRUCTION FOR MARINE PROPULSION DEVICE OF WATER JET TYPE

BACKGROUND OF THE INVENTION

This invention relates to a lubricant construction for a marine propulsion device of the water jet type and more particularly to an improved gear casing and lubricating system for a marine outboard drive.

In many forms of marine outboard drives, it is well known to include a bearing arrangement for supporting and sustaining the axial and radial loads of a driving shaft. This type of drive is employed in outboards of the conventional propeller type or also those of the jet propulsion type. In order to insure long life and cooling of the bearings, it is normally the practice to pack the bearings with a grease type lubricant. There are a number of disadvantages to such an arrangement.

In the first instance, the grease is not as effective in lubricating and cooling the bearings as is a lubricating oil. In addition, the leakage problems associated with grease are well known. Leakage occurs due to the fact that the grease expands when it is heated and can force it out of the seals which are provided to contain the grease. Furthermore, the grease must be replaced quite often (such as every ten hours of running or so) and this requires substantial disassembly of the outboard drive in order to extract and repack the bearings. Furthermore, when the bearings are disassembled and must be reassembled, this requires a certain degree of skill so as to insure that the bearings are properly located. In addition, the repacking of bearings is not as simple a job as it appears since it must be insured that all of the old grease is removed and fresh grease is inserted without the entrainment of foreign matter during the repacking process.

It is, therefore, a principal object of this invention to provide an improved lubricating system for the bearings of a marine outboard drive.

It is a further object of this invention to provide a lubricating system for the bearings of a marine outboard drive wherein a lubricating oil rather than a lubricating grease may be used.

One of the reasons why lubricating oil has not been previously used to any wide extent for the bearings of a marine outboard drive is the difficulties in changing the lubricant. That is, it must be insured that all of the lubricant is drained and replaced each time the bearings are relubricated. Thus, many of the same problems attendant with changing of the lubricating grease are also incurred when lubricating oil is utilized. It must be understood that the marine outboard drive may, in many instances, be relatively permanently attached to the transom of the associated watercraft, even when the outboard drive comprises an outboard motor.

Therefore, it is a still further object of this invention to provide an improved lubricating system for the bearings of a marine outboard drive in which lubricating oil is employed and in which the lubricating oil may be completely drained and refilled with the outboard drive in position.

SUMMARY OF THE INVENTION

This invention is adapted to be embodied in a bearing arrangement for a marine outboard drive having an outer housing that is affixed to a transom of an associated watercraft and which is pivotal from a normal running condition to a tilted up out of the water condition. A drive shaft is journaled within the outer housing and at least one bearing is fixed within the outer housing and cooperates with the drive shaft for journaling the drive shaft within the outer housing. A lubricant cavity is formed within the outer housing and at least in part encircles the bearing. In accordance with the invention, a drain passage extends through the outer housing for draining lubricant from the lubricant cavity for replenishing lubricant without the necessity of disassembling the bearing. The drain pasage is located relative to the lubricant cavity so that it will be positioned vertically below the lubricant cavity when the outboard drive is tilted up so as to drain all lubricant from the lubricant cavity without removal of the outboard drive from the watercraft transom.

DETAILED DESCRIPTION OF THE PREFERRED EMBODIMENTS

Figure 1:
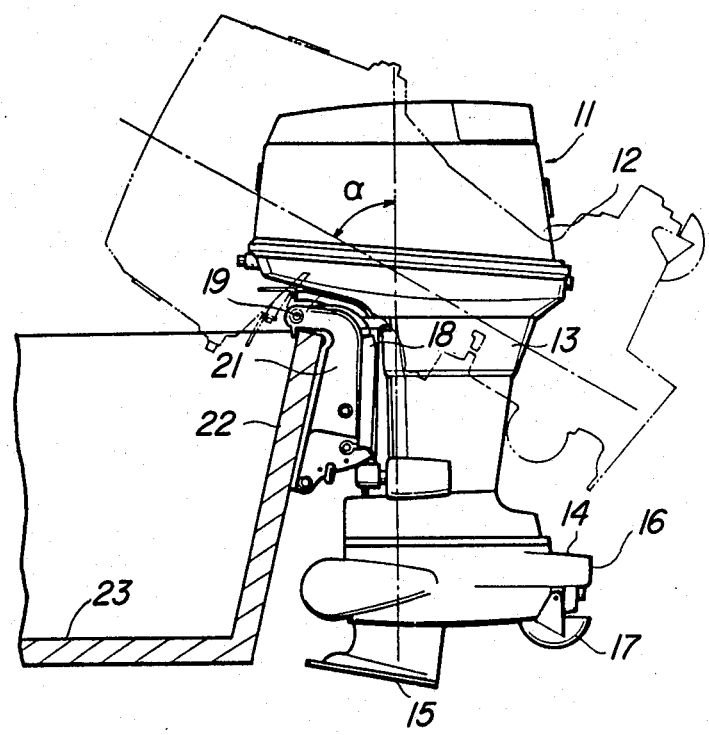
FIG. 1 is a side elevational view of an outboard drive, constructed in accordance with a first embodiment of the invention, as attached to the transom of an associated watercraft, shown partially and in cross-section. The solid line view shows the outboard drive in its normal running condition while the phantom line view shows the outboard drive in its tilted up out of the water condition.

Referring first to FIG. 1, a marine outboard drive constructed in accordance with a first embodiment of the invention is identified generally by the reference numeral 11. The marine outboard drive 11 is, in the illustrated embodiment, an outboard motor of the jet propulsion type. It is to be understood, however, that the invention can be utilized in conjunction with other types of marine outboard drives such as the outboard drive portion of an inboard-outboard assembly and also in connection with outboard drives powered by propellers rather than jet propulsion units. The invention, however, has particularly utility in connection with jet propulsion outboard motors.

The outboard drive 11 includes a power head 12 that is comprised of a powering internal combustion engine, which may be of any known type, and a surrounding protective cowling. A drive shaft housing 13 depends from the power head 12 and contains a drive shaft (to be described) that is driven by the engine output shaft in a known manner. A lower unit 14 is affixed to the lower portion of the drive shaft housing 13 and contains a jet propulsion unit, as will be described. This jet propulsion unit draws water from the body of water in which the watercraft is operating through an inlet 15, pressurizes it and discharges it through a discharge nozzle 16 for powering the associated watercraft in a known manner. A reverse bucket assembly 17 is pivotally supported in juxtaposition to the discharge nozzle 16 for redirecting the water jet so as to achieve reverse operation.

The drive shaft housing 13 has affixed to it a steering shaft (not shown) that is journaled for steering movement within a swivel bracket assembly 18. The swivel bracket 18 is, in turn, pivotally connected by means of a pivot pin 19 to a clamping bracket 21. The clamping bracket 21 is, in turn, affixed to a transom 22 of an associated watercraft 23. The pivot pin 19 permits the outboard drive 11 to be tilted between a normal running condition as shown in solid lines in FIG. 1 and a tilted up out of the water condition as shown in phantom lines in this figure through the angle.

Figure 2:
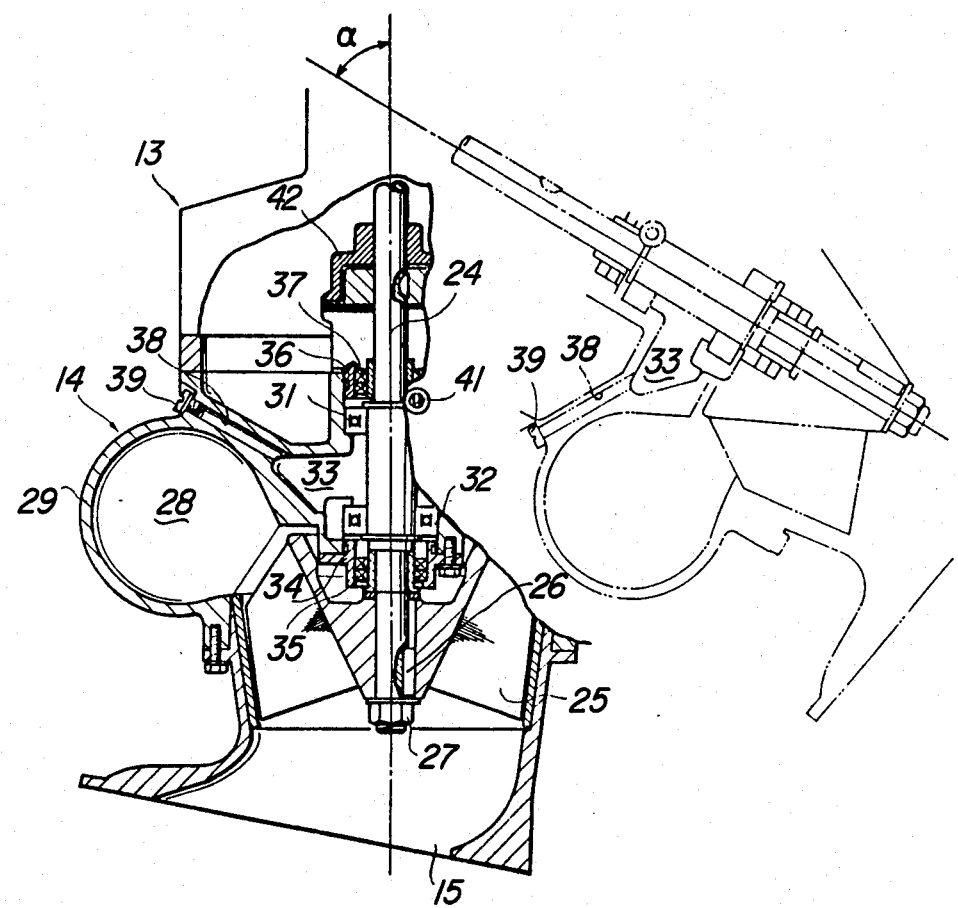
FIG. 2 is a vertical cross-sectional view of the drive shaft portion of the outboard drive showing it in its normal running condition in solid lines and in its tilted up out of the water condition in phantom lines.

Referring now to FIG. 2, the construction of the lower unit 14, jet drive and lubricating system therefor will now be described. A drive shaft 24, which as has been noted is driven from the engine of the power head 12, extends through the drive shaft housing 13 and terminates within the lower unit 14. An impeller 25 is affixed to the lower portion of the drive shaft 24 by means including a key 26 and nut 27. The impeller 25 functions to draw water through the inlet 15 and pressurize it within a volute chamber 28 formed in a portion 29 of the lower unit 14. The water from the volute chamber 28 is redirected rearwardly for discharge through the discharge nozzle 16 in a known manner.

A pair of axially spaced anti-friction bearings 31 and 32 are disposed at opposite sides of a lubricant cavity 33 that is formed within the lower unit 14 and rotatably journal the drive shaft 24 and take the driving thrusts exerted upon it. A lower oil seal housing 34 is affixed to the lower unit 14 and carries a lower oil seal 35 that sealingly cooperates with the drive shaft 24 for sealing the lower portion of the lubricant cavity 33. The seal housing 34 is also sealingly engaged with the lower housing cavity 14 so as to insure a good seal at the lower end of the lubricant cavity. In a similar manner, an upper seal carrier 36 is affixed to the lower unit 14 and carries a seal 37 that is sealingly engaged with the drive shaft 24 at the upper end of the lubricant cavity 33 and above the bearing 31.

A combined fill and drain passage 38 extends vertically downwardly through the lower unit 14 from an opening that is normally closed by a plug 39 to the lubricant cavity 33. When the outboard drive 11 is in its normal operating condition, the upper end of the passage 38 is disposed vertically above the cavity 33 so that lubricant can be added to it. In addition, an air vent opening 41, which is also closed by an appropriate plug, is provided at the upper end of the lubricant cavity 33 so as to insure complete filling.

When it is desired to change the lubricant within the cavity 33, the outboard drive 11 is pivoted from its normal running condition to a tilted up out of the water condition. Normally, the outboard drive may be tilted through about 60 degrees ($\alpha$) under this condition. However, in order to facilitate servicing, it is desirable if the opening 38 is disposed so that it will be positioned at the lower end of the cavity 33 as seen in the phantom line view of FIG. 2, when the angle $\alpha$ is less than the full tilted up position, such as 45 degrees. Under this condition, the plug 39 can be removed and it will be seen that all of the lubricant can be drained from the cavity 33. When the lubricant has been drained, the outboard drive 11 is again tilted down and the chamber 33 can be filled through either the opening 38 or the opening 41.

An engine coolant pump 42 is driven by the drive shaft 24 at an area above the interface between the drive shaft housing 13 and the lower unit 14 for supplying coolant from the body of water in which the outboard drive is operating to the engine of the power head 12 in a known manner.

Figure 3:
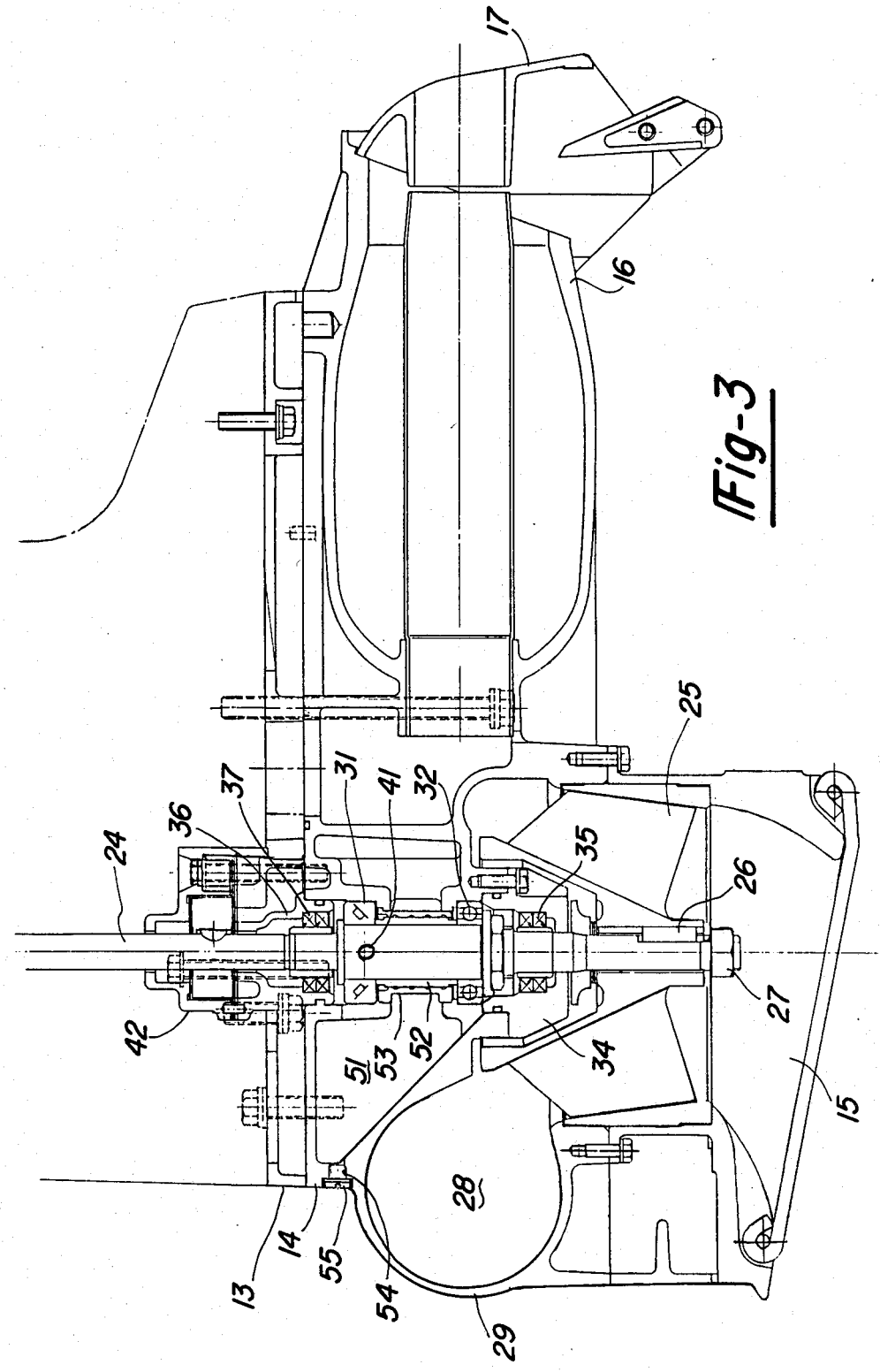
FIG. 3 is a cross-sectional view, in part similar to FIG. 2, showing another embodiment of the invention, with the normal running condition in solid lines and the tilted up out of the water condition in phantom lines.

FIG. 3 shows another embodiment of the invention which is generally similar to the embodiment of FIGS. 1 and 2. For that reason, those components which are the same as the previously described embodiment have been identified by the same reference numerals and will be described again only insofar as is necessary to understand the construction and operation of this embodiment.

Basically the difference between this embodiment and the preceding embodiment is that a lubricant chamber 51 is formed by the lower unit 14 which is substantially greater in volume than that of the previously described embodiment in that the chamber 51 tapers upwardly and outwardly from the inner periphery of the volute chamber 28 so as to provide a significantly greater capacity. Also, a larger portion of this capacity is provided at the upper part thereof so any loss of lubricant will not seriously deplete the amount of lubricant available for lubricating the bearings 31 and 32.

There is provided a collar 52 that is fixed to rotate with the drive shaft 24 and which cooperates with a sleeve 53 that has a helical groove in it so as to carry lubricant upwardly from the lower portion of the chamber 51 to the bearing 31 so as to insure that the bearing 31 will be lubricated even if there is a very lower amount of lubricant in the lubricant chamber 51. A drain passgeway 54 intersects the lubricant cavity 51 at its upper portion and is normally closed by a plug 55.

When the outboard drive is operating in its normal running condition as shown in the solid line figures, the opening 54 will be above the normal lubricant level as set by the air vent 41. However, when the outboard drive is tilted up to something less than its normally fully tilted up position, as with the embodiment of FIGS. 1 and 2, the drain passage 54 is positioned vertically beneath the lower power of the lubricant chamber 51 so that all lubricant can be conveniently drained therefrom as shown in the phantom line view of this figure.

It should be readily apparent from the foregoing description that two embodiments of the invention have been illustrated and described and each of which insures an adequate supply of lubricant for the bearings of an outboard drive and wherein an oil lubricating system can be used that can be conveniently drained by merely tilting the outboard drive up to its tilted up out of the water position. Although two embodiments of the invention have been illustrated and described, various changes and modifications may be made without departing from the spirit and scope of the invention, as defined by the appended claims.

I claim:

1. In a bearing arrangement for a marine outboard drive comprising an outer housing supported for pivotal movement relative to the transom of an associated watercraft and when attached thereto between a normal running condition and a tilted up service position, a drive shaft within said outer housing, at least one bearing fixed within said outer housing and cooperating with said drive shaft for journaling said drive shaft within said outer housing, a lubricant cavity formed within said outer housing and at least in part encircling said bearing, a fill and drain passage extending through said outer housing for draining lubricant from said lubricant cavity for replenishing lubricant thereof without necessitating disassembly of said bearing and which said outboard drive is still attached to the watercraft transom, said fill and drain passage being positioned vertically beneath said lubricant cavity when said outboard drive is tilted up to its service position relative to the tramsom of the watercraft to which it is attached for draining of lubricant from said lubricant cavity and disposed above said lubricant cavity for filling of said lubricant cavity to its normal filled condition when said outboard drive is in its tilted down running condition and attached to the watercraft transom.

2. In a bearing arrangement as set forth in claim 1 wherein the drive shaft housing is supported for pivotal movement about a horizontally disposed tilt axis.

3. In a bearing arrangement as set forth in claim 1 wherein the service condition is at a lesser angle than a fully tilted up position of the outboard drive.

4. In a bearing arrangement as set forth in claim 3 wherein the drive shaft is a vertically oriented shaft.

5. In a bearing arrangement as set forth in claim 4 wherein the outboard drive comprises a pump driven by the drive shaft.

6. In a bearing arrangement as set forth in claim 5 wherein the pump comprises a jet pump.

7. In a bearing arrangement as set forth in claim 6 wherein the lubricant cavity is positioned vertically above the jet pump.

8. In a bearing arrangement as set forth in claim 7 wherein the drive shaft drives a jet pump for driving the outboard drive.

9. In a bearing arrangement as set forth in claim 8 wherein the drive shaft extends in a vertical direction when the outboard drive is in its tilted down running condition.

10. In a bearing arrangement as set forth in claim 1 wherein the drive shaft drives a jet pump for driving the outboard drive.

11. In a bearing arrangement as set forth in claim 10 wherein the drive shaft extends in a vertical direction when the outboard drive is in its tilted down running condition.

* * * * *